US008768259B2

(12) United States Patent
Terrero Diaz-Chiron et al.

(10) Patent No.: US 8,768,259 B2
(45) Date of Patent: Jul. 1, 2014

(54) METHOD AND APPARATUS FOR COLLECTING USER ACTIVITY IN A TELECOMMUNICATIONS SYSTEM

(75) Inventors: Maria Esther Terrero Diaz-Chiron, Madrid (ES); Maria Luisa Mas Rosique, Madrid (ES); Nuria Nuria Esteban Vares, Aranjuez (ES); Enrique Córdoba Plaza, Madrid (ES); Erik Rolin, Älvsjö (SE); Timo Forsman, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1551 days.

(21) Appl. No.: 12/375,770

(22) PCT Filed: Aug. 1, 2006

(86) PCT No.: PCT/SE2006/050274
§ 371 (c)(1),
(2), (4) Date: Nov. 6, 2009

(87) PCT Pub. No.: WO2008/016320
PCT Pub. Date: Feb. 7, 2008

(65) Prior Publication Data
US 2010/0093284 A1 Apr. 15, 2010

(51) Int. Cl.
*H04B 17/00* (2006.01)
(52) U.S. Cl.
USPC .................. 455/67.11; 455/435.1
(58) Field of Classification Search
CPC .......................... H04W 8/26; H04L 29/08072
USPC .................. 455/435.1, 436; 709/224, 228
See application file for complete search history.

(56) References Cited

U.S. PATENT DOCUMENTS 6,201,967 B1 * 3/2001 Goerke .................. 455/435.1
6,665,537 B1 * 12/2003 Lioy ..................... 455/435.1
(Continued)

FOREIGN PATENT DOCUMENTS

WO    WO 02/19625 A2    3/2002
WO    WO 03/096729 A1   11/2003

OTHER PUBLICATIONS

Lucent Tech. Use of AAA from SIP Servers in the IP Multimedia CN Subsystem. 3GPP TSG-SA3 Ad Hoc on 'IMS Security' S3z10023. Madrid Apr. 25-26, 2001.
(Continued)

*Primary Examiner* — Phuoc H Doan

(57) ABSTRACT

Method and apparatuses for collecting user activity information in a telecommunications system. A first telecommunications node (120) handling signaling of the terminal of a user sends a message (516) notifying a registration event (515) of the user to a second node (130) handling registration information of said user. The message comprises an information element (ACT) indicating whether the user has been involved in a service provided during a registration period comprised between a previous registration event (501) of said user and said notified registration event. At reception of the message, the second node updates registration information (430) and activity information (440) of the user. By including service usage information in registration notification messages, the operator of the telecommunications system can obtain information about the rate of service usage in the system without requiring implementation of neither new nodes nor new messages to be exchanged by new or existing nodes.

31 Claims, 4 Drawing Sheets

(56) References Cited

U.S. PATENT DOCUMENTS

| | | | |
|---|---|---|---|
| 7,634,558 | B1* | 12/2009 | Mangal et al. ............... 709/224 |
| 2004/0121775 | A1 | 6/2004 | Ropolyi et al. |
| 2004/0158630 | A1* | 8/2004 | Chang et al. ................. 709/224 |
| 2005/0159156 | A1 | 7/2005 | Bajko et al. |
| 2005/0176428 | A1 | 8/2005 | Gabor et al. |

OTHER PUBLICATIONS

International Telecommunication Union. ITU-T H 323. Jul. 2003.

Rosenberg, J et al. SIP: Session Initiation Protocol. Network Working Group. RFC 3261. Jun. 2002.

3GPP. $3^{rd}$ Generation Partnership Project; Technical Specification Group Services and System Aspects; IP Multimedia Subsystem (IMS); Stage 2 (Release 7). 3GPP TS 23.226 v7.3.0. Mar. 2006.

3GPP. $3^{rd}$ Generation Partnership Project; Technical Specification Group Services and System Aspects; Presence Service; Architecture and Functional Description (Release 7). 3GPP TS 23.141 v7.0.0. Dec. 2005.

3GPP. $3^{rd}$ Generation Partnership Project; Technical Specification Group Core Network; Presence Service Using IP Multimedia (IM) Core Network (CN) Subsystem; Stage 3 (Release 7). 3GPP TS 24.141 v7.1.0. Mar. 2006.

3GPP. $3^{rd}$ Generation Partnership Project; Technical Specification Group Services and System Aspects; 3GPP Enablers for Open Mobile Alliance (OMA); Push-to-Talk over Cellular (PoC) Services; Stage 2 (Release 6). 3GPP TR 23.979 v6.2.0. Jun. 2005.

3GPP. $3^{rd}$ Generation Partnership Project; Technical Specification Group Core Network and Terminals; IP Multimedia (IP) Subsystem Sh Interface; Signalling Flows and Message Contents (Release 7). 3GPP TS 29.328 v 7.2.0. Jun. 2006.

* cited by examiner

METHOD AND APPARATUS FOR COLLECTING USER ACTIVITY IN A TELECOMMUNICATIONS SYSTEM

FIELD OF THE INVENTION

The present invention relates to a method and apparatuses for collecting user activity information in a telecommunications system.

BACKGROUND

A telecommunications system usually comprises a communications network and a plurality of telecommunications nodes which communicate through said network, wherein each node is arranged to perform one or a set of specialized functions so as to serve telecommunication services to the users of said system. A telecommunications node is a functional entity that, depending on construction details, can be implemented within a single physical machine, or can be distributed across various physical machines, each implementing a part of the total functionality required and/or standardized for said node.

While the number of nodes in a telecommunications system has traditionally depended on factors such as: the total number of users the system is intended to serve, or the geographical distance of the user terminals of these users; the different kind of nodes within a concrete telecommunications system are more dependent on its specific characteristics.

For example, legacy telecommunications systems, such as Public Switched Telephone Network PSTN systems, were essentially comprised of routing nodes, arranged to handle (routing, processing, etc) signaling messages originating or terminating in user terminals.

As opposed to legacy telecommunications systems, which assumed a given user to be permanently associated to a fixed point of attachment for his user terminal, some modern telecommunications systems provide dynamic registration capabilities. These telecommunications systems allow a user to register and deregister his presence in the system from a user terminal which, in most of the cases, does not need to attach to the system from the same access point. This is commonly accomplished by sending, respectively, registration and deregistration messages from the user terminal to the telecommunications system, which updates the registration information of the user accordingly. The registration information usually comprises the registration status of the user (e.g. if registered or unregistered) and information usable to find the routing node assigned to handle signaling to/from the terminal of said user.

Examples of modern telecommunications systems as referred above are: Global System for Mobile Communications GSM, also known as $2^{nd}$ Generation 2G mobile systems; Universal Mobile Telecommunications System UMTS, also known as $3^{rd}$ Generation 3G mobile systems; and systems based on modern multimedia communications protocols, such as H.323 based systems (e.g. as defined in ITU-T H.323; July 2003) or Session Initiation Protocol SIP based systems (e.g. as defined in IETF RFC3261; June 2002). An example of the latest is the so called IP Multimedia Subsystem IMS (e.g. as defined in 3GPP TS 23.228 V7.3.0; March 2006).

The need of providing a dynamic registration capability for users has driven a trend for devising modern telecommunications systems comprising, not only routing nodes, but location registration nodes arranged to handle registration information of the users. For example, in 2G mobile systems Mobile Switching Centers MSC or Serving GPRS Support Nodes SGSN are routing nodes, and Home Location Registers HLRs are location registration nodes. In IMS systems, the so called Call Session Control Function CSCF nodes perform as routing nodes while the Home Subscriber Servers HSS perform as location registration nodes. In short, registration and deregistration messages from a user terminal are received in a routing node, which notifies the registration event (e.g.: initial registration, re-registration, deregistration) to a location registration node. The location registration node then updates the registration information concerning to the user of the terminal accordingly.

Additionally, the need of providing new kind of telecommunications services beyond the traditional user-to-user communications, or in addition to them, has caused also the appearance of new kind of nodes (generally known as "application servers" AS) specialized in providing the final service to the user, or to mediate in said provision. Examples of these kinds of nodes are Presence Servers or Network based Watcher Application Server (e.g. as described in: 3GPP TS 23.141 V7.1.0; December 2005, or 24.141 V7.1.0; March 2006), SIP Application Servers (e.g. as defined in the aforementioned 3GPP TS 23.228) or Push-to-talk PoC server (e.g. as described in 3GPP TR 23.979 V6.2.0; June 2005).

In addition to some already standardized services cited above as examples, a plurality of new services can also be envisaged, which can be provided from, or through, a telecommunications system (e.g.: an information service based on user location, such as local weather or local taxi information; mediation for electronic commerce; etc). However, as in the example cases cited earlier, the implementation of these new services will, in most of the cases, also require specialized application servers, and the cooperation of other nodes in the telecommunications system with these application servers; for example, for routing the signaling and/or media related to the services, or for obtaining additional information (e.g. current location, authentication assertions, user information such as preferred language, etc).

In summary, modern telecommunications systems have become more complex, as they tend comprise a plurality of different kind of nodes and tend to offer more and more services. However, as opposed to legacy telecommunications systems offering essentially basic voice communication services, the traffic load in some nodes of some modern systems is not so directly related to the total number of users who are subscribed to it, since some services are only provided upon user request and, for example, a given user can make a frequent use of some service(s) and a very scarce, or even null, use of some other service(s). In this situation, is then conceivable that the operator of a telecommunications system can be interested in obtaining information about the usage rate of some of the resources of the system for several reasons.

A first reason is, for example, to better dimensioning some system resources, such as the number of nodes of a given type and/or the capacity of said nodes. For example, in case an operator desires to offer a new kind of service, a deployment strategy can be to first make the service available to a set of selected users. Then, according to the usage rate during a given period, the operator can estimate what could be the total rate usage in case the service is made available to all its subscribed users, and thus, for example, the number of application servers needed to provide the service and their required capacity. Accordingly, the obtainment of user activity information in a simple way, minimizing the impact in the signaling and in the nodes of the telecommunications system, is highly desirable.

A second reason relates to pricing criteria when acquiring telecommunications equipments from technology providers.

A typical pricing parameter for some telecommunications nodes uses to be related to the rate of usage of the node; for example, related to the maximum number of users that can be configured to be served in said node. As those skilled know, in computer-based telecommunications nodes this can be accomplished by a specific software which controls that the rate usage does not exceed the acquired "usage licenses".

Thus, when acquiring, for example, a HLR or a HSS, the price agreement between the operator and the provider of the node can be established depending on the number of users whose subscriber data can be configured in said node and who shall be served for registration information from it. Similarly, when acquiring an application server, the price agreed with the provider can, for example, depend on the number of users who can subscribe to the service provided from that node and/or, depending on the nature of the service, depending on the number of users whose relevant data can be configured therein so as to receive the service.

However, what commonly provides a benefit for the operator of a telecommunications system is not the number of users the system can attend for any of the services it can provide, but the usage of these services. Thus, it is understandable that some operators may desire to agree with the technology providers the price of some nodes, not merely based on their capacity (e.g.: based on the number of users that can be configured and/or served by the node), but according to the usage rate of the services provided from said node, or through its intervention. This can require the agreement of the final price to be fixed after some time in operation of the node(s) in question, and, for this purpose, the collection of user activity information in a simple way, minimizing the impact in the signaling and in the nodes of the telecommunications system, is also desirable.

SUMMARY OF THE INVENTION

In one aspect, the invention relates to a method for collecting user activity information as claimed in claim 1. In further aspects, the invention also relates to telecommunications nodes as claimed in claims 10 and 17, and to computer programs as claimed in claims 25 and 26. Embodiments of the invention are set out in the dependent claims.

According to the invention, the notification of a registration event concerning a user from a routing node, which handles signaling messages of the terminal of the user, to a location registration node, which handles registration information of said user, comprises, in addition to the information of the corresponding registration event of the user, additional information indicating whether the user has been involved in a service provided during a given registration period. The registration period comprises a time interval elapsed between a previous notified registration event of said user and a subsequently notified registration event. The location registration node updates registration information and activity information of the user according to the content of the received notification.

By including information about whether a user has been involved in some service(s) as an additional information in a registration notification which is nowadays already carried out from a routing node to a location registration node, the operator of a telecommunications system can obtain user activity information with a low implementation impact in the system, as the solution does not requires new messages to be implemented by any of the nodes of the system, nor the implementation of new nodes to collect the necessary user activity information.

According to one embodiment, the additional information identifies the service, or services, provided to the user in the registration period. This can provide the operator of the telecommunications system with detailed usage information per user and/or per service.

According to another embodiment, the location registration node stores, in relationship with the received and/or updated activity information, a time-stamp related to the registration period. The operator of the telecommunications system can thus obtain a detailed service usage in a given period per user and/or per service.

According to another embodiment, the registration period can be defined so as to start with the reception of an initial registration of the terminal of the user, or with the reception of a subsequent re-registration of said terminal, and to end with the reception of a subsequent re-registration, or with the reception of a de-registration. Since in some systems an initial registration is followed by subsequent, usually periodical, re-registrations, the user activity information can be collected by the routing node, and notified to the location registration node, either: periodically, or considering the time elapsed between the registration of a user and his de-registration; thus, allowing the operator to obtain information about behaviour of service usage per user with a higher or lower degree of granularity.

Further embodiments of the invention relates to the mechanisms for checking in the routing node the signaling related to the terminal of the user for determining whether the user is involved in a service and, accordingly, for collecting user activity information of the user which shall be notified to the location registration node.

In one embodiment, the routing node stores an activity template comprising data usable for identifying a signaling message as related to a service. In order to make an easy detection of service activity, the data in the activity can comprise: an identifier identifying a particular signaling message; an identifier identifying a sequence of signaling messages, which can comprise a sequence of identifiers each identifying a signaling message; or an identifier identifying a service, which is usable to compare the content of a signaling message so as to determine whether a particular service is identified on it.

According to another embodiment, an activity template is received in the routing node from the location registration node together with the user profile data which are usually received at an initial registration of a user. This allows establishing per user the criteria to determine user activity information, as well as the users whose activity is going to be monitored, and, at the same time, avoids the implementation of new messages for transferring activity template data.

DETAILED DESCRIPTION

Exemplary embodiments of the invention shall now be described with reference to FIGS. 1 to 4.

Figure 1:
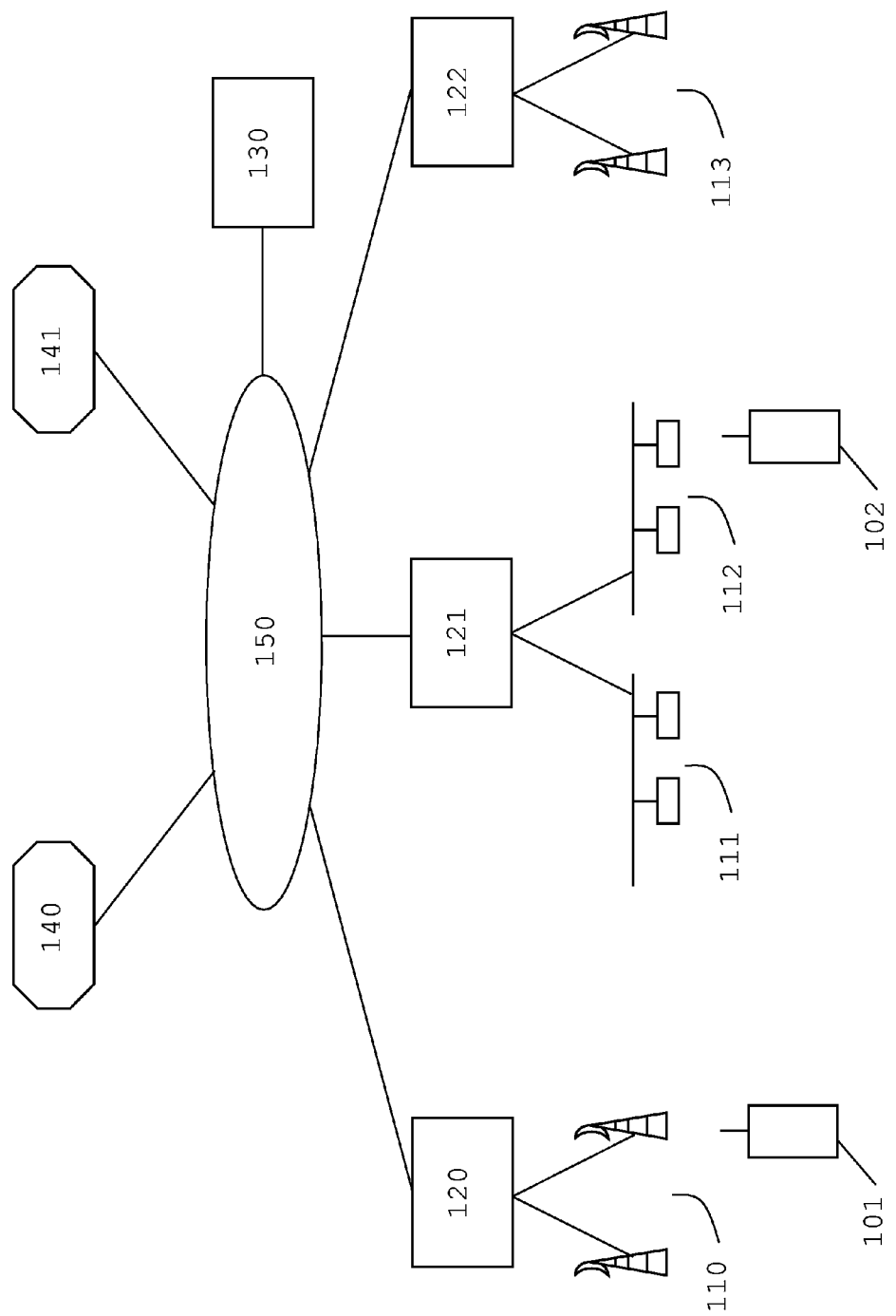
FIG. 1 shows a simplified view of a telecommunications system used to illustrate some embodiments of the invention.

FIG. 1 illustrates schematically a state-of-the-art telecommunications system. It shall be noticed that the abstraction represented in FIG. 1 does not intend to relate to a specific telecommunications system nor intends to depict all the possible nodes which can exist on it, but rather those which, being commonly implemented in modern telecommunications systems, are relevant to illustrate the invention. However, for a better illustration of some of the embodiments, the system of FIG. 1 will, in some example cases, be assumed to represent some nodes of a 3G system incorporating an IP Multimedia Subsystem IMS.

In the system of FIG. 1, a plurality of access points (110, 111, 112, 113) provide the physical (wired or wireless) connection of the user's terminals (101, 102), so as to allow them to access to the services provided by, or through, said system. For example, if the telecommunications system of FIG. 1 is assumed to represent a 3G system with IMS, which is intended to support different access types, accesses 110 and 113 could represent UMTS radio base stations providing radio access to mobile terminals (101, 102), while access 111 and 112 could represent, respectively, a Local Area Network LAN, and a Wireless Local Area Network WLAN. In that case (IMS), some other nodes (such as Gateway GPRS Support Nodes GGSNs, Media Gateways, etc) can be also present within the system, which, for the sake of clarity, are not shown in FIG. 1.

Nodes 120, 121 and 122 handle the signaling related to the user terminals attached to the system. Each of these routing nodes is represented serving several access points which are connected to it, as it is commonly configured in e.g. 2G or 3G systems. Nevertheless, depending on the characteristics of a telecommunications system, there can be routing nodes to which the user terminals can connect directly. In the configuration shown in FIG. 1, routing node 120 would serve the signaling to/from user terminal 101, which is attached to the system via access 110, while routing node 121 would be assigned to serve the signaling to/from user terminal 102, which is attached to WLAN 112.

As an illustrative example, routing nodes 120, 121 and 122 can be Call Session Control Functions CSCF of an IMS system.

The system of FIG. 1 provides dynamic registration capabilities to their users via location registration node 130, which stores registration information of the users of the system. In the case illustrated as example, location registration node 130 would keep registration information of the user of terminal 101 as served from routing node 120, and of the user of terminal 102 as served from routing node 121. When, for example, terminal 101 roams to the coverage area of access 113, or, for example, terminal 102 is switched off, the corresponding registration information is updated in location registration node 130 according to the registration events which are notified by the involved routing nodes. As an illustrative example, location registration node 130 can be Home Subscriber Server of an IMS system.

The registration information stored in node 130 can be used by routing nodes, and also by application servers, to obtain information about the routing node currently assigned to handle signaling to/from the terminal registered for a given user. For example, if node 121 receives a signaling message from terminal 102 requesting the establishment of a communication session and comprising an identifier of the user of terminal 101 (e.g. a Mobile Subscriber ISDN Number MSISDN, or a Uniform Resource Identifier URI, assigned to said user), then node 121 can query location registration node 130 and would obtain information for routing the request towards routing node 120.

Nodes 140 and 141 represent application servers AS. These nodes host the service logic to accomplish with one or more specific services. For example, node 140 can be a Presence Server arranged to manage presence information for providing a Presence service. In short, among other functions, a Presence Server manages a subscription of a user to the information related to the status of another user, or group of users, (e.g.: an "on-line"/"off-line" status information indicating if a given user is presently registered with a terminal in the telecommunications system), as well as the obtainment of the necessary data from other nodes in the system so as to provide said information. For this reason, AS 140, on its role of Presence Server, may need to communicate (directly or indirectly) with, e.g., location registration node 130 so as to obtain registration information of a given user.

It is to be noticed that not all the nodes represented in FIG. 1 need to belong to the network domain of a given network operator. For example, operators of 2G or 3G systems use to provide interconnection of their system for allowing inter-operator roaming. Further, while some services offered to the users subscribed to a given operator are provided by ASs belonging to the network domain of said operator, some other services can be offered from ASs belonging to the network domain of another provider. As an example case, AS 141 can be assumed to belong to a specialized service provider, who is not a network operator of a 2G or 3G system. Accordingly, the interconnection network 150 represents schematically a plurality of communication links of one or more underlying communication networks, including, e.g., intranets and/or the Internet.

The internal simplified structure of routing node 120 and location registration node 130 shall now be described with reference to FIG. 2 considering a possible implementation as computer-based apparatuses which, as in most of the modern telecommunications systems, is a preferred implementation for telecommunications nodes.

A telecommunications node which serves or mediates in the services provided by or through a telecommunications system (such as a SGSN, a HSS, a CSCF, etc.), regardless its specific construction details, may be considered as an apparatus comprising of one or more functional modules, each of them arranged to perform a specific (sub)function of the total functionality implemented by said node and, eventually, arranged to cooperate with some of the others. Furthermore, in some implementations, the functionality of a given node may be distributed across various physical machines; each performing a part of the total functionality said node is assigned to perform. Once the functionality of a node in a telecommunications system has been defined (e.g. by a telecommunications standard, or some other document), the construction of the functional modules to build up a realization of the corresponding physical machine(s) is a matter of routine work for those skilled in the art.

In particular, a routing node 120, or a location registration node 130, implemented as a computer-based apparatus comprises software and hardware, which can be located within a physical machine, or distributed along various cooperating physical machines. A specific functional module of any of said nodes implemented as a computer-based apparatus may comprise: software, hardware, or a combination of both, wherein said functional module is designed to perform a specific (sub)function of the node and, if proceeds, to cooperate with software and/or hardware parts which implements other of its functional modules. The software can comprise one or more computer programs (computer readable program code) that, when executed by a computer-based apparatus makes it to behave according to a predefined manner, as determined by the specific program instructions in said programs, which is in accordance to the specific functionality of the telecommunications node it implements.

Figure 2:
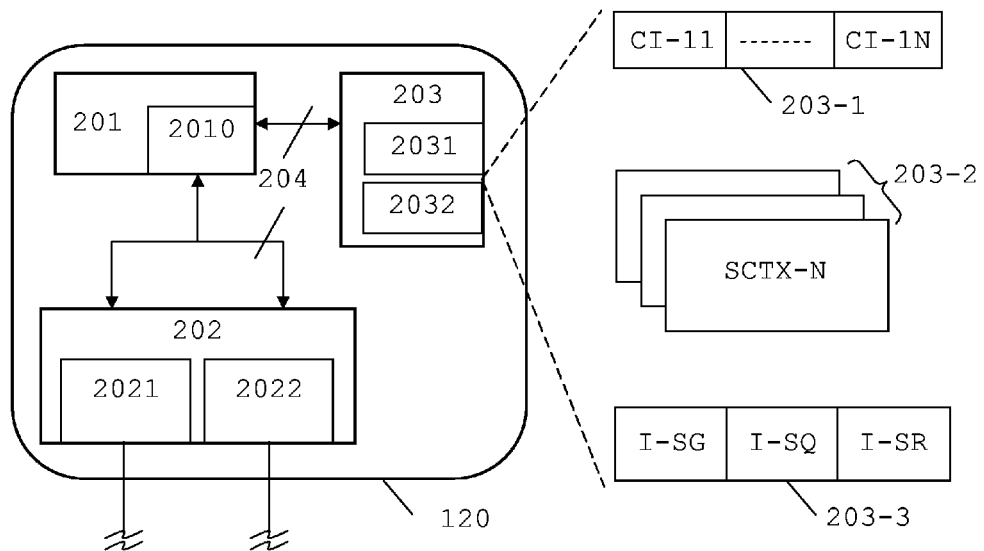
FIG. 2 shows a schematic representation of some functional modules of a routing node and a location registration node according to one embodiment of the invention.
Figure 2:
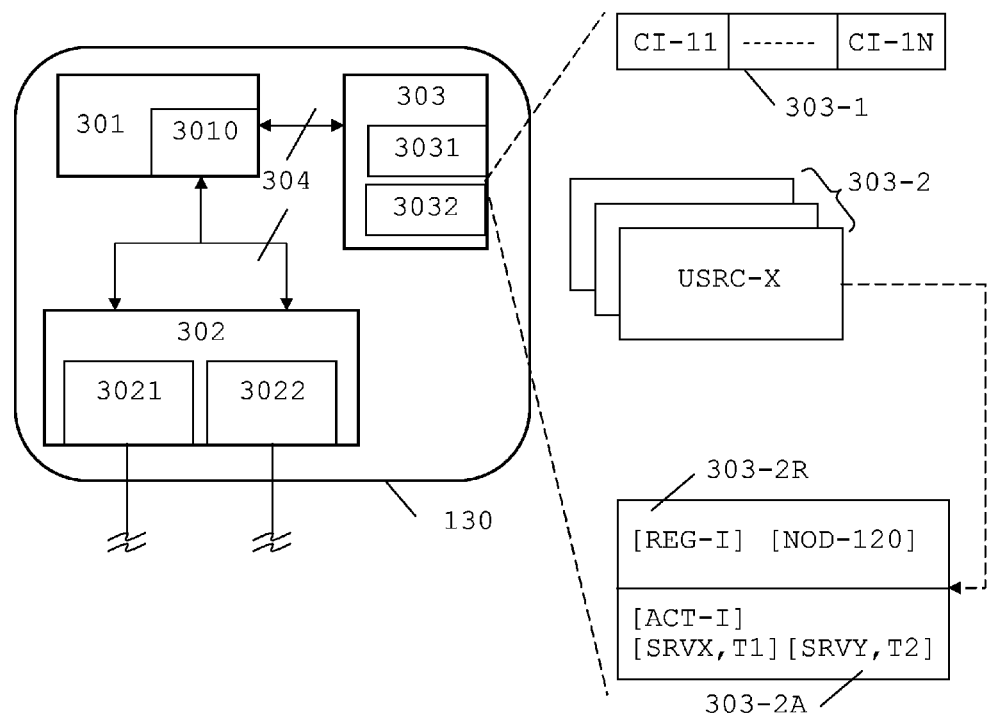

Accordingly, the explanation given with reference to FIG. 2 shall describe some functional components of a routing node 120 and of a location registration node 130 without falling into specific construction details concerning the possible physical realizations, which are well known by those skilled and, consequently, which are not needed to understand the invention.

The simplified internal structure shown in FIG. 2 for routing node 120 comprises: a processing module 201, a communications module 202, a data storage module 203 and internal communication bus 204 which allow data communication and cooperation between them. A similar structure is shown for location registration node 130 comprising: a processing module 301, a communications module 302, a data storage module 303 and internal communication bus 304. It is to be noticed here that, depending on specific characteristics, some routing nodes can comprise further modules (e.g. to accomplish with media transcoding and/or media routing) which, for the sake of simplicity, are not shown in the simplified structure shown in FIG. 2 for node 120.

Any of the processing modules (201, 301) can comprise one or more processors (2010, 3010) which, for example, can be arranged to work in load-sharing or active-backup mode.

In the scenario illustrated in FIG. 1, processor 2010 in routing node 120 executes service logic for handling the signaling related to user terminal 101. In particular, assuming node 120 is a CSCF on its role of "Serving CSCF" S-CSCF, the service logic comprises performance of session control for the user terminal 101 and, by monitoring the messages exchanged with terminal 101, as well as messages sent on behalf of that terminal or messages received from other nodes for that terminal, the maintenance of a session state for every communication established by that terminal. As the signaling related to a user terminal 101 comprises, not only signaling related to services, but also registration messages, the service logic executed by processor 2010 in S-CSCF 120 further comprises handling of communications with location registration node 130 for notifying registration events of the user registered through said terminal. The service logic executed by processor 2010 is further enhanced with the novel functionality of the invention that shall be later detailed.

Processor 3010 in location registration node 130 executes service logic for handling registration information of some (or all) the users of the network domain of an operator of a telecommunications system. In the scenario illustrated in FIG. 1, it handles the notifications of registration events received from routing nodes 120, 121 and 122, and updates the registration information concerning to the user of the terminals 101 and 102 according to the notified registration events. The service logic executed by processor 3010 is further enhanced with the novel functionality of the invention that shall be later detailed.

Communications between routing node 120 and other entities (such as: routing nodes 121, 122; location registration node 130, application servers 140, 141; user terminals 101, 102; etc) are performed via communications module 202, illustrated in FIG. 2 as comprising two communication devices 2021 and 2022. Similarly, communications between location registration node 130 and other nodes in the system (120, 121, 122, 140, 141) are performed via communications module 302, illustrated in FIG. 2 as comprising two communication devices 3021 and 3022. In general, when a message is to be sent, the processing module requests the communications module to send the message and provides it with the necessary data, and, when a message is received by the communications module, it transfers the relevant content to the processing module for triggering the necessary processing.

Depending on implementation alternatives, some of the communication devices (2021, 2022, 3021, 3022) can be devoted to a specific kind of communication; for example: only with some other node with which a standardized or proprietary signaling interface is used, only for a given type of communication protocol, etc. Also, depending on implementation details, some of the communication devices may be suited to handle any kind of the communication that may be carried out by any of these nodes according to more than one communication protocol. For example, "DIAMETER" protocol (IETF RFC3588, September 2003) can be used between a S-CSCF (e.g. routing node 120) and a HSS (e.g. location registration node 130) to convey, among other, messages notifying registration information of users. This communication protocol (as well as other protocols) can be easily extended for allowing conveyance of new or modified contents, so as to accomplish with invention, as will be later described.

The number of communication devices in a routing node 120 or in a location registration node 130 may vary depending on their respective capacity for handling external signaling compared with the overall signaling estimated for each of these nodes. Depending also on implementation details, a communications module (e.g. 202) may comprise some functional or physical elements (hardware, software or combination) that may be common to one or more communication devices (e.g.: 2021, 2022), such as a part of a given communications protocol stack, being, the other (protocol specific) parts residing on the corresponding communication device.

Data storage modules 203 and 303 stores the data needed for the operation of, respectively, routing node 120 and location registration node 130. A data storage module in a computer-based telecommunications node can comprise one or more data storage devices. In the example illustrated in FIG. 2, data storage module 203 in routing node 120 comprises storage devices 2031 and 2032, and data storage module 303 in location registration node 130 comprises storage devices 3031 and 3032. Memory chips and magnetic or optical discs, are example of data storage devices. Depending on criteria such as data access speed for certain data, storage reliability, etc, the storage module of a telecommunications node can comprise one or more storage devices of the same or different kind.

According to implementation options, the data storage module of a certain node can reside all within the same physical machine, or can be distributed among various storage machines. For example, in the case of location registration nodes there is a recent trend to store subscriber information data in a mass-storage specialized database, accessible to (usually) more than one front-end location registration machines, which handle the location registration related signaling exchanged with routing nodes, and keep locally some other data (e.g. basic operation data and dynamic registration data). Whether the data handled by a particular node are stored within the same physical machine or not is not relevant for the invention.

Regardless physical data distribution details, FIG. 2 illustrates schematically some of the data that can be handled by routing node 120 and location registration node 130, which shall now be described.

The operation of node 120 is controlled by computer-readable program code 203-1 comprising instructions (CI-11 . . . , CI-1N) that, when executed by processor 2010, makes it to perform as a routing node described heretofore, and also performing new functions according to embodiments of the invention.

Reference 203-2 represents a plurality of data records (SCTX-N), each related to the user terminals which are assigned to be served from routing node 120. The nature of these data can vary to a great extent depending on the specific characteristics of the system; however, in systems where a user can register from a terminal which can be attached from different access points, the assigned routing node uses to store the necessary addressing information of the access point used by the terminal, so as to route signaling towards said terminal through the access point.

For example, if routing node 120 is the S-CSCF assigned to user terminal 101 when it registered into a IMS system, then S-CSCF 120 keeps data about the "Proxy-CSCF" P-CSCF which is serving the access to terminal 101. In this case, S-CSCF 120 would also keep some user profile data of the user registered through terminal 101, which would have been received from a HSS (e.g. location registration node 130). Also, if user terminal 101 is involved in a service (e.g. a multimedia session with user terminal 102, a service session with AS 141, etc), S-CSCF 120, as a statefull SIP proxy, would keep some service state data for said terminal according to the signaling exchanged in relationship with said service (e.g. it keeps updated service state data by implementing a state machine driven by the sequence of messages related to said terminal and service which are exchanged through it).

For accomplishing with some embodiments of the invention, routing node 120 can store some further data that shall now be described.

For example, routing node 120 can store one or more activity templates 203-3. An activity template according to the invention is a set of one or more data which is usable by the routing node for determining whether the signaling concerning a given user or terminal exchanged through said node is related to a service activity which needs to be reported. It shall be noticed that the service activity criteria, or, in other words, the criteria to determine whether a user or terminal has to be considered as involved in a service, does not necessarily depend on whether the user requests the service (i.e. acts as originating party) or terminates it (i.e. acts as terminating party), but on data of the activity template.

The nature and structure of these data can vary according to multiple realization alternatives depending on factors such as: the kind of service activity events which are desired to be detected, or the balance between the degree of detail of the information to be collected versus the complexity of the implementation. Some of these alternatives are described below.

In a simple implementation alternative, an activity template can comprise an identifier of a signaling message I-SG, or an identifier of a service I-SR which can be conveyed in a signaling message (e.g. in case the same kind of signaling message can convey requests of different services). Thus, as routing node 120 is involved in routing the signaling originated and terminating in user terminal 101, it can check whether the identifier of a message related to said terminal (i.e.: received from, sent to, to be sent to, or sent on behalf of, user terminal 101) matches an identifier stored in the corresponding activity template 203-3. Also, routing node 120 can inspect the content of the message beyond its message identifier, so as to determine a matching between any of its further contents (e.g. the identifier of a service contained on it, or any other service related data) and the content of the activity template. Accordingly, an activity template can, additionally or alternatively, comprise an identifier usable to identify a particular content in a message.

In some cases, it can be suitable to establish the activity of a user in respect to a service with regard to a pre-defined sequence of signaling messages. For example, if the user requested a given service from his terminal, the determination on whether, finally, the user has to be considered as "active" or not for said service can be made based on the outcome of said request; e.g.: based on a subsequent message on the same flow, and/or based on the content of a subsequent message. For this reason, an activity template can also contain one or more identifiers identifying a sequence of signaling messages I-SQ, and, eventually, identifying also some of their eventual contents.

It is to be noticed that the identifiers of messages, sequences and/or contents cited above and the corresponding ones that can be stored in an activity template (I-SG, I-SQ, I-SR) for the sake of matching need not to be the same, but merely usable to identify each other. For example, a mapping between a—say—"standard" identifier, conveyed in a signaling message and the corresponding (i.e. internal) identifier, used in the template, can be easily established by a simple translation table.

In order to facilitate the detection of user activity in a routing node 120, some existing data, which may be currently used in that kind of node in the processing associated to the reception or sending of a given message, such as for triggering $3^{rd}$ party auxiliary processing (e.g.: the "triggers" of Intelligent Network IN processing or Customized Application Mobile Enhanced Logic CAMEL processing, or the "Initial Filter Criteria" IFC in the service control model in a IMS system), can also be used by routing node 120 for the purpose of the invention, for example, as activity templates. Specifically, but not necessarily, this embodiment can be applied whenever a specific sequence of messages is to be considered for determining user activity in a routing node, as the logic for $3^{rd}$ party auxiliary processing in some routing nodes already implement call/service-state models having processing states which are driven by sequence of messages related to a user terminal.

In routing node 120, the same activity template 203-3 can apply for checking the signaling exchanged for any registered user terminal served from said node.

Alternatively, an activity template can be defined to be applied for a particular user, or for a particular user terminal, or for a given set of users or terminals. As long as a routing node can receive (e.g. at registration phase, from the location registration node and from the terminal) one or more identifiers of the user and of his terminal, this embodiment can be accomplished by establishing in the routing node a relationship between an identifier of a user (e.g. an MSISDN), or an identifier of a terminal (e.g. an International Mobile Equipment Identifier IMEI), and the corresponding applicable activity template. In this case, advantageously, the activity template to be applied to a particular user in a given routing node 120 can be received together with, or as a part of, the user profile data which can be received in routing node 120 from location registration node 130 when the terminal of a user 101 request an initial registration.

Accordingly, for the plurality of users that can be served from a routing node in a given moment, there can be applied different activity templates, the same template for some or all of them, or even none for some or all of them. By defining different activity templates for some users, the operator of a telecommunications system can obtain activity information of certain groups of users and, thus, analyze the behaviour of, for example, users who recently subscribe to the system, users who are selected to test a new service, etc.

The operation of node 130 is controlled by computer-readable program code 303-1 comprising instructions (CI-11 ..., CI-1N) that, when executed by processor 3010, makes it to perform as a location registration node described heretofore, and also performing new functions according to embodiments of the invention.

Node 130 stores a plurality of user data records 303-2 for each user it is assigned to serve as location registration node. For a given user, his corresponding record USRC-X stores registration information 303-2R stating if the user is registered or not (REG) and some further information, which may vary depending on characteristics of the particular telecommunications system. For example, the registration information 303-2R of a given user data record USRC-X can also comprise information (NOD-120) of the routing node currently assigned to handle the signaling of a terminal registered in the system for said user (if there is any).

In some telecommunications systems, such as GSM or IMS, the user data record of a user USRC-X stores also more static information of a user, commonly known as user profile data or user subscription data, which may comprise information usable to handle services originating and/or terminating on the user (e.g. whether a given service is allowed, the identifier of an alternative destination in case an incoming call can not be attended, an identifier of an AS assigned to handle a given service involving said user, etc). In these telecommunications systems, some of these data (not detailed in FIG. 2) are transferred from location registration node (e.g.: HLR, HSS) to a routing node (e.g.: MSC, S-CSCF) when the routing node notifies the location registration node a registration event stating that a user has registered through it into the system from a terminal.

According to the invention, the location registration node 130 receives user activity information, which is collected by routing nodes (120, 121, 122), and which is notified from these nodes to the location registration node 130 together with registration events of the concerned users.

For a given user, routing node 120 collects, according to the applicable activity template, activity information during a registration period and forwards it to the location registration node 130. The registration period can comprise a time elapsed since the user terminal 101 of the user made an initial registration until it deregister from the system. Alternatively, as in some telecommunications systems the registration process of an already registered user terminal is performed periodically (mainly due to security reasons), the registration period can be established so as to cover: a time comprised between an initial registration and a subsequent re-registration, and/or a time between subsequent re-registrations, and/or a time between the initial registration or the last re-registration and a subsequent de-registration. Accordingly, routing node 120 can store user activity information of a user, for example, in the corresponding record SCTX-N of a user, until this information is to be sent to the location registration node 130 in a message notifying a registration event of said user.

The same or similar temporary storage criteria can be used when the user activity information is to be determined according to a predefined sequence of signaling messages exchanged through routing node 120. Thus, if the sequence identifier(s) stored in the applicable activity template states that a user is to be marked as active for a service if, for example, his terminal sends a first message "X" which is subsequently replied (e.g. from the counterpart of the service) with a second message "Y", the routing node 120 can store temporarily a mark stating that message "X" was received, so that, in case message "Y" appears in the same signaling sequence, this information can be checked and the user activity information stored in routing node 120 for that user can be updated accordingly.

Alternatively, if routing node 120 keeps a state machine driven by the sequence of messages related to a terminal within a communication session, the activity template can comprise the identifier of a specific service-state, which would imply a pre-defined sequence of messages has occurred for a user terminal; so that the transition to a certain state defined in the template would cause routing node 120 to store the necessary activity information for the corresponding user that shall be later notified to the location registration node 130. In addition to an identifier of a service-state, the activity template could also comprise an identifier of a message, and/or content in a message (e.g. identifier of a service, or a service specific content) which, when received in a certain service-state defined in the template, would cause the routing node 120 to store the necessary activity information for the corresponding user to be later notified to the location registration node 130.

FIG. 2 illustrates an embodiment of the invention wherein the location registration node 130 stores activity information of a user 303-2A in relationship with the rest of data of said user (USRC-X). Other embodiments can also be envisaged wherein, for example, the location registration node 130 stores this information independently of user data records 303-2, and/or forwards it to another node which, for example, is assigned for said storage and/or arranged to perform a subsequent post-processing of said data. In any case, the activity information of a user held by a location registration node 130 depends on the activity information it receives from routing nodes (120, 121, 122) where said user has registered his terminal(s) (e.g. 101); therefore, the illustrative embodiments described hereinafter related to the possible content of said information, although referred to the activity information held by a location registration node 130, can equally apply to the activity information temporarily kept by a routing node until it is forwarded to a location registration node, as well as to the activity information forwarded from the routing node to a location registration node.

In a plain realization, the activity information of a user 303-2A can comprise a simple flag (ACT) stating whether the user has been active or not according to the activity criteria established in the activity template. In a more complex realization, the activity information 303-2A can comprise a list of one or more identifiers of services (SRVX, SRVY) in which the user has been involved according to said criteria, and also time stamps (T1, T2) indicative of when said activity took place. These time stamps can be set according to time information received from the routing node 120, or set by the location registration node 130, for example, at reception of the registration event notifications from the routing node.

Figure 3:
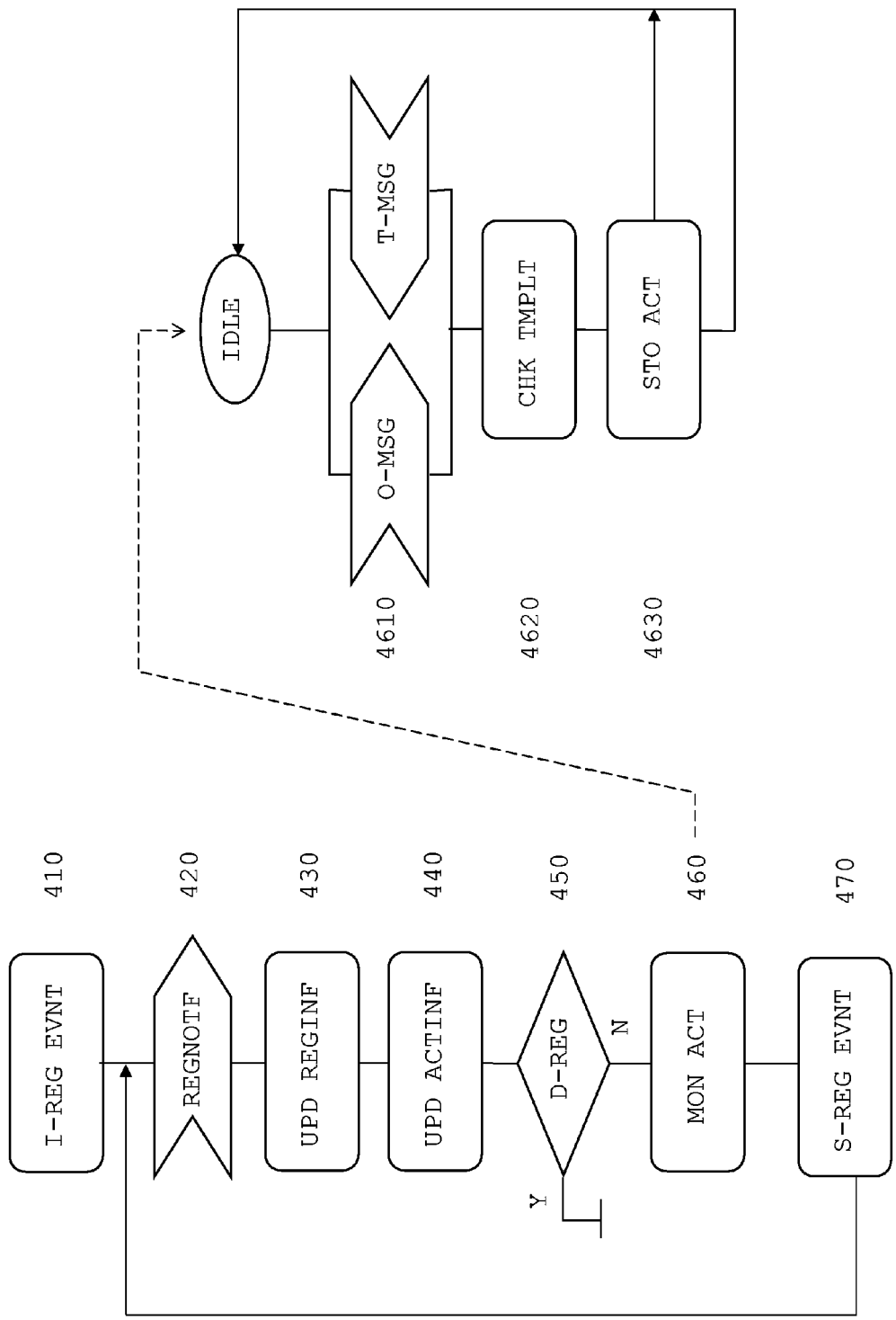
FIG. 3 shows a flowchart illustrating steps of a method for collecting user activity information according to one embodiment of the invention.

The steps of a method for collecting user activity information according to one embodiment of the invention are illustrated in FIG. 3. This embodiment consider the following arrangement for registration periods for which activity information of a user is notified from a routing node to a location registration node: a first registration period covers a time between the initial registration of the user from a terminal and ends with a subsequent re-registration of said user; subsequent registration periods cover a time between subsequent re-registrations, and the last registration period covers a time between a re-registration and the final de-registration.

In step 410 an initial registration event (I-REG EVNT) of a user is detected in a routing node. If the signaling in the telecommunication system between a user terminal and a routing node is, for example, according to SIP protocol (as it is the case in a IMS system), this event can be related with the reception in a S-CSCF of a REGISTER message for a user who is not yet registered in that S-CSCF. In step 420, the routing node sends a message (REGNOTF) notifying this registration event to the location registration node. In this moment of the execution, as it is an initial registration, the routing node has not yet user activity information to report to the location registration node; thus, the message only conveys information stating that a user (identified in the message) has registered from a terminal. Alternatively, the message can comprise an specific information element for conveying user activity information with a pre-defined content for indicating null activity.

At reception of the message notifying the registration event, the location registration node updates in step 430 the registration information (303-2R) of the user according to the notified registration event. In this example case, it can store that the user is registered in the system, and information about the particular routing node which notified the registration event. Then, in step 440 the location node updates the activity information of the concerned user. As, according to the example case, no activity information is reported from the routing node, the step 440 can comprise, for example, no action in the location registration node in respect to the, eventually, previously stored activity information of the user (303-2A). Alternatively, the location registration node can store a time stamp associated to the time this registration event has been received from the routing node, which can be later associated to the activity information subsequently notified from that routing node for that user (if any).

In step 450 the routing node checks whether the registration event received in step 410 is a de-registration (D-REG) or not. As in the example case illustrating the method the processed registration event was an initial registration, the check yields a negative result (N) and the method proceeds to step 460.

Once the initial registration of the user terminal is accomplished (which can comprise further steps not shown in FIG. 3, such as authentication of the user terminal from the routing node, acknowledgement of the registration from the location registration node, etc), the routing node runs the monitoring activity process on step 460, the steps of which are detailed in FIG. 3.

According to the illustrated embodiment, the monitoring activity process 460 is in state idle until a message related to the concerned user is received. Step 4610 represents, as triggers of the process: the arrival (or processing) in the routing node of a message originated from the terminal of the user (O-MSG), and the arrival (or processing) in the routing node of a message to be sent to the terminal of the user (T-MSG). However, the trigger can also be related to the sending (or processing) of a message to be sent on behalf of the terminal (e.g. as a result of the reception of a message from the terminal which is further routed from the routing node towards another node), or related to the sending (or processing) of a message to be sent to the terminal (e.g. as a result of the reception in the routing node of a message addressed towards the user of the terminal).

In step 4620 the message is checked against the content of the corresponding activity template (203-3).

It shall be noticed that the relationship between the trigger step 4610 and the checking step 4620 can depend on embodiments related to whether the activity of all the user terminals registered in a routing node are to be monitored or not. For example, if the same activity template is not to be used for any user served from a routing node, then the routing node can first check (step not shown in FIG. 3) whether, according to any of the embodiments related to activity template assignation described earlier, there is an activity template related to an identifier of the user, or of his terminal, received in a message processed in step 4610.

Alternatively, the routing node can set a special mark in a temporary session record created for a user. In some implementations, and mainly for the sake of storing service-state information, a session record is created by the routing node when a signaling dialog is created with a user terminal as a result of a service request originated from the terminal or terminating in the terminal. In this case, when processing a signaling message on step 4610, the routing node could check whether the corresponding session record is marked or not before running further steps.

Alternatively, if the same activity template is to be applied to some users having terminals registered in the routing node, the corresponding user data records of the concerned users (SCTX-N) can comprise a mark establishing whether a check (step not shown in FIG. 3) of the corresponding template proceeds for any signaling dialog related to this user terminal and, thus, if it proceeds at this step or not.

Therefore, there can be further steps not shown in FIG. 3 for determining whether the check of step 4620 proceeds or not, and, if proceeds, for selecting the applicable activity template.

The execution then proceeds to step 4630, wherein the routing node stores activity information according to the matching between the activity criteria established in the activity template and the processed message, and/or its content. The information stored, or updated, by routing node in step 4630 can vary according to the embodiments described earlier in relationship with the structure and possible content of the user activity information; which can range from a simple mark, to a more complex and detailed information related to specific services, time, service specific data, user's identifiers, etc. Then the monitoring process 460 returns again to the idle state.

In step 470 a subsequent registration event (S-REG EVNT) of the user is detected in the routing node. For a user already registered from a terminal, this event can be a de-registration, or, if the system requires periodical registrations, a re-registration. As cited earlier, it can be assumed that this time the event is a re-registration. If the telecommunications system is a SIP based system, such as IMS, this event can be related with the reception in a S-CSCF of a SIP message REGISTER from a user whose terminal is already registered through said S-CSCF.

The execution in the routing node then proceeds again to step 420 wherein it sends a message (REGNOTF) notifying the location registration node the registration event (a re-registration in this example case). Assuming that the user was involved in a service which was detected by the monitoring process (460) since the initial registration (I-REG EVNT) was received, the message then conveys an information element indicating that fact, which, as described earlier, can comprise simple or complex activity information of the concerned user in respect to the service(s). Once reported the activity information to the location registration node, the routing node can, as an option, delete the activity information collected for that registration period (in this example case: from the initial registration to a subsequent re-registration).

At reception of the message notifying the re-registration event, the location registration node executes steps 430 and 440 as described earlier. Assuming the user was involved in a service, the location registration node in step 440 updates the previously stored activity information of the user (303-2A)

according to the activity information received from the routing node in said message (REGNOTF). The location registration node can add some further data; for example, it can store in relationship with the received activity information a time stamp indicative of the concerned registration period. In the case taken as example, the time stamp can be associated to the time in which this registration event is received, or associated to the time the initial registration event was received (e.g. it could have been stored when the initial registration was reported indicating no activity—first execution of step 440).

In step 450 the routing node checks the nature of the registration event received in step 410. As in this example case it is assumed it is neither a de-registration, then the execution proceeds with the monitoring step 460, as described above, until a new (subsequent) registration event (S-REG EVNT) is received.

The cycle of steps 420 to 460 can then be repeated as long as a registration event different from a de-registration is detected in the routing node in step 470. Therefore, according to embodiments of the invention, the registration periods for which the activity of a user is monitored by the routing node and the corresponding activity information notified to the location registration node can comprise: a time between an initial registration and a de-registration, a time between an initial registration and a re-registration, a time between subsequent re-registrations, and a time between a re-registration and a subsequent de-registration. For example, in case a de-registration is detected on a step 470, steps 420 to 440 would run as described earlier, and the execution of the method for collecting user activity information would stop in the checking of step 450.

Depending on specific characteristics of the telecommunications system, a de-registration event can be detected in step 470 by the routing node in different cases. A first case can be the reception in the routing node of a de-registration request message from the user terminal. For example, in case of SIP signaling, this can be accomplished by sending a REGISTER message indicating a expiration value of zero seconds). A second case can be a time-out during a registration period. In this situation, a registered user terminal has failed to re-register within the specified time interval and, as a result, the routing node considers it as not registered and notifies a de-registration event to the location registration node. A third case can be related to administrative procedures started from the telecommunications system. For example, a terminal registered for a user in the telecommunications system can be automatically de-registered in cases such as: when the terminal has been stolen, subscription termination, pre-paid credit is exceed, etc. In the particular case of a IMS system, an administrative de-registration can be accomplished by sending from a service platform (e.g. a specific application server), of from a HSS, a registration termination request to the S-CSCF assigned to the concerned terminal. In all these de-registration cases, once the de-registration event is detected on a step 470, the execution of the method continues through steps 420 to 440, and stops in the checking of step 450.

In telecommunications systems providing dynamic registration capabilities the same user can register his presence in the system from different access points, which may involve changes in the assigned routing node. Therefore, the activity information of the same user can be collected in a location registration node from the different routing nodes where said user roams with a user terminal.

Figure 4:
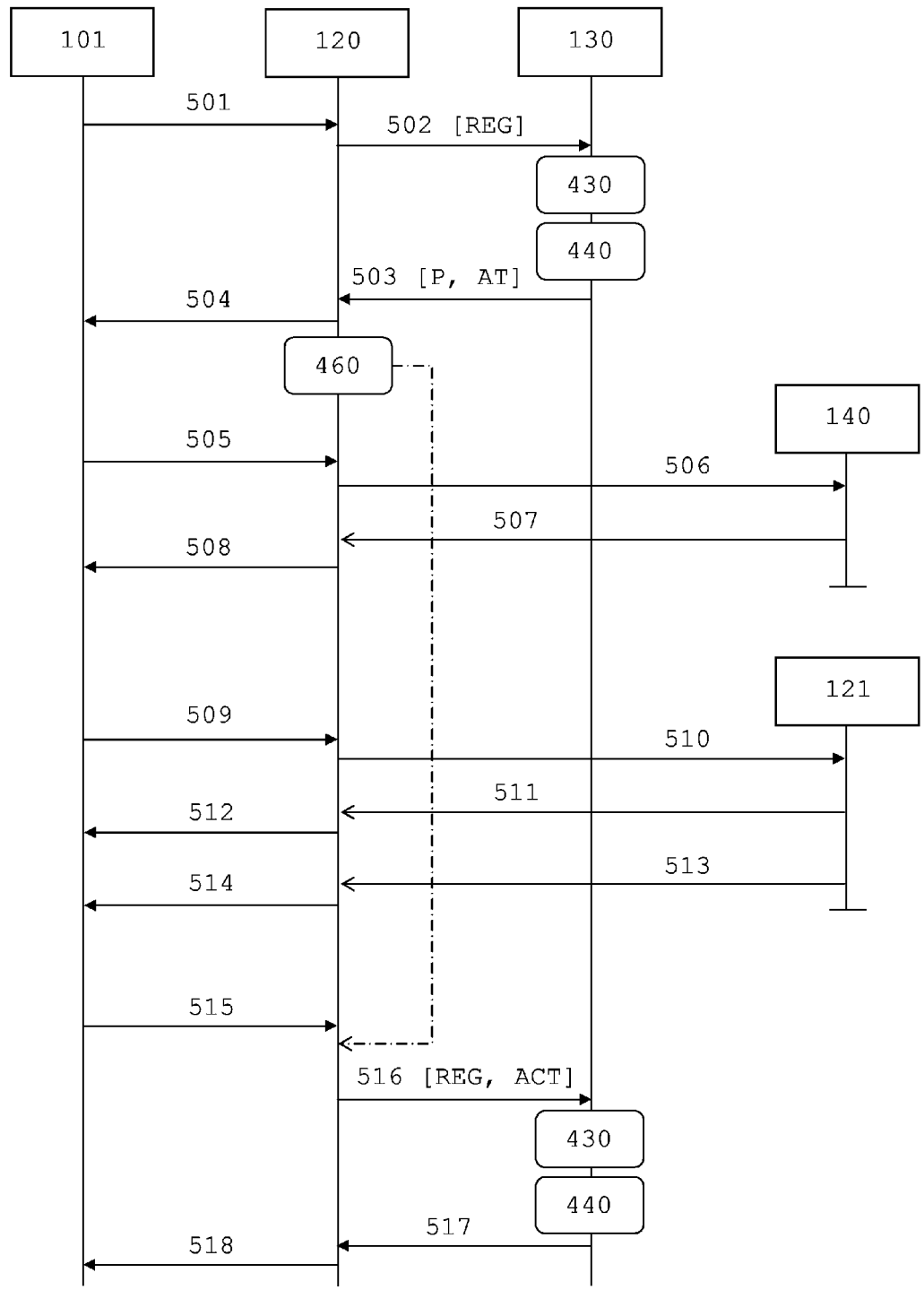
FIG. 4 shows a simplified signaling flow illustrating some of the steps of FIG. 3 according to one embodiment of the invention.

FIG. 4 shows a simplified signaling flow involving interactions of some of the entities shown in the telecommunications system of FIG. 1, and illustrating some of the steps of FIG. 3. For the sake of a clearer explanation, FIG. 3 does not show all the eventual signaling which can take place between these entities, but only those signaling flows which are relevant to illustrate the invention.

As an example case, it can be assumed that the telecommunications system is a IMS system, wherein routing nodes 120 and 121 are S-CSCFs, location registration node 130 is a HSS, application server 140 is a Presence Server, and user terminal 101 is a IMS capable user equipment which, initially, is not yet registered in the IMS. For the sake of clarity, some more nodes which may intervene in the routing of the signaling and media to/from the user terminal, but which are not needed to illustrate this embodiment of the invention (such as base radio stations, SGSNs, GGSNs, media gateways, as well as other CSCFs on "interrogating" or "proxy" roles—I-CSCF, P-CSCF), are not shown. However, as will be apparent for the skilled person, other embodiments are also possible where some of these nodes can be arranged so as to accomplish with the invention; for example a SGSN can collect and report user activity information to a HLR or to a HSS when it notifies a GPRS registration event.

In flow 501 a registration message REGISTER arrives to S-CSCF 120 from user terminal 101. The S-CSCF 120 detects that the user terminal is not yet registered into the system (e.g.: it checks that the parameter "integrity protected" indicates "no") and notifies an initial registration to the HSS 130 in flow 502. In a IMS system this is accomplished by sending a DIAMETER message "Server-Assignment-Request" SAR comprising information (REG) indicating "registration", which indicates that a user terminal has made a first registration of an identity of a user. Considering the case illustrated as example, as the S-CSCF 120 has not collected yet any activity information of that user, then the SAR message 502 does not convey activity information. To report no activity for a user in a message notifying a registration event various embodiments are possible. For example, the routing node S-CSCF 120 can send a specific information element comprising a pre-defined default value which can be interpreted by location registration node 130 as "no activity". Alternatively, this specific information element can be omitted, which could then be interpreted by the location registration node HSS 130 also as "no activity".

As illustrated, the HSS 130 then runs steps 430 and 440 for updating, respectively, registration information of the user of terminal 101 and activity information of said user. In the illustrated case, given that the user of terminal 101 made an initial registration through S-CSCF 120, the HSS would no receive any activity information reported yet in message 502, but only registration information (REG) comprising, among other, an identifier of S-CSCF 120 and the registered user identity(ies). Since in IMS the assigned S-CSCF would need some data related to the user for accomplishing with some of its functions, the HSS answer in flow 503 to the S-CSCF 120 with a DIAMETER message "Server-Assignment-Answer" SAA, which comprises user profile data (P) of the concerned user. Additionally, according to one embodiment of the invention, the SAA message can further comprise activity template data (AT) applicable to monitor the activity of said user, which the S-CSCF can store in relationship with any of the dynamic data it stores for said user, or for its terminal, while registered through it.

The S-CSCF 120 then notifies the result of the registration to the user terminal 101 in flow 504, for example, with a SIP 200 OK message, and starts the monitoring activity process 460. As described earlier with reference to FIG. 3, process 460 runs in S-CSCF 120 for checking signaling messages related to user terminal 101 Vs. the applicable activity template, and for recording user activity accordingly until this information is notified to the HSS for a registration period. As those familiar with authentication procedures in IMS will appreciate, between flows 501 and 504 there can be some other signaling flows which are intended to authenticate the user identity indicated in the initial REGISTER (flow 501). As cited earlier, for the sake of clarity, these flows are not shown in FIG. 4.

Subsequent flows 505 to 514 are shown in FIG. 4 to illustrate some services in which the user of terminal 101 can be involved during a registration period. A first illustrated example is related to the Presence service. In short, this service provides the ability for a telecommunications system to gather and provide presence information of a user terminal. This information can be obtained from inputs from that user terminal and/or from some nodes in the system, and can be provided to other user terminals, usually, upon request and authorization. A second illustrated example is a multimedia call between two user terminals.

If the user of terminal 101 wants to obtain presence information about a second user, then, he requests that service trough his terminal which, in flow 505, sends a SIP message SUBSCRIBE indicating "presence" in the "Event" parameter and identifying said another user. The message can also indicate the time during which the presence information of the second user is to be notified to user terminal 101, for example, in parameter "Expires".

In flow 506 the S-CSCF 120 routes the received service request to the corresponding node. According to Presence service procedures in a IMS system (e.g. as defined in the aforementioned 3GPP TS 24.141), the S-CSCF 120 would route the request towards the routing node (e.g. another S-CSCF) serving the signaling of the second user based on the analysis of his identifier, which should then forward said request to the corresponding Presence server serving presence information of said second user. However, in FIG. 4, this has been simplified and direct signaling flows between S-CSCF 120 and the Presence server 140 are shown for the sake of clarity.

The monitoring process 460 in the S-CSCF 120 can check the message (received 505 or sent 506) against the corresponding (i.e. general, user specific, etc) activity template. Accordingly, depending on the applicable activity criteria, it can determine, for example, that the user of terminal 101 has to be marked as active in the current registration period by the mere fact that he sent a SUBSCRIBE message. Alternatively, it can determine that the user has to be marked as active (and, as an option in any of the referred example cases) the corresponding additional information stored) depending on some further content of the message; for example, if the message indicates "presence" in the "Event" parameter, and/or only if the subscription time indicated in the service request ("Expire" parameter) exceeds a certain value.

Also, as the service request needs to be acknowledged in some way from the Presence server (e.g. accepted or rejected), the S-CSCF 120 can determine, by checking the activity template, that the user is to be marked, or not, as active depending on the outcome of the service request, and thus, for example, wait until a subsequent signaling indicating acceptance from the Presence server 140 is received in the current signaling session, or wait until a subsequent signaling flow related to the service execution is received (e.g., as the NOTIFY message referred later).

For example, the activity template can comprise data for identifying a given signaling message received in a particular sequence (e.g. with reference to a message-driven service-state variable). Further, as the activity template can comprise data establishing that a user is to be marked as active for a given service (e.g. Presence service) depending on some service specific parameter (e.g. subscription time), and only if the service is accepted or executed (e.g. a NOTIFY message referred later), the S-CSCF 120 can store some data that were conveyed in the service request (505), or in some other message exchanged during the service establishment, so as to check them later.

At reception of the presence subscription request 506, the presence server 140 can perform the necessary authorization checks on the originator of the request, so as to ensure it is allowed to receive presence information about the second user. If the authorization conditions are met, the presence server accepts the request by sending a SIP 200 OK message in flow 507, which is forwarded from S-CSCF 120 to the requesting user terminal 101 in flow 508. As cited above, the S-CSCF 120 can, according to the content of the applicable activity template, store activity information for the user of terminal 101 (FIG. 3, step 4630) upon processing of the successful request (flows 507, 508). Alternatively, the monitoring process in the S-CSCF 120 can wait for a subsequent signaling message; for example, if the applicable activity template states that the user is to be marked as active for this service when a notification conveying presence information of the second user is received from the presence server 140; e.g. a SIP message NOTIFY indicating "presence" in the "Event" parameter (flow not shown in FIG. 4). In this case, the activity template can contain an identifier (or identifiers) usable by the monitoring process in S-CSCF 120 for identifying, for example: the NOTIFY message, its content and/or the sequence of previous messages (SUBSCRIBE, 200 OK).

While registered into the telecommunications system through S-CSCF 120, the user of terminal 101 can request a communication with another user. In this case, the user terminal 101 sends a SIP INVITE message in flow 509 comprising an identifier of the destination user. If the user of terminal 101 desires to establish a multimedia communication comprising preferably video and audio, then the INVITE message comprises (embedded within Session Description Protocol SDP specific elements) information about the codecs supported by terminal 101 for these kind of communications. This content can be verified against the applicable activity template by the monitoring process 460 in S-CSCF 120, or, as referred, earlier, kept by the S-CSCF 120 for a later verification when processing a further message. For example, the user can be considered as active for this service if a communication comprising video is offered and accepted by the counterpart user terminal.

In flow 510 the S-CSCF 120 performs an analysis of the destination identifier and routes the INVITE message towards its destination. According to session initiation procedures in IMS (e.g. described in the aforementioned 3GPP TS 23.228), the S-CSCF 120 can route the message towards an I-CSCF of the destination network domain. This I-CSCF should then query to a HSS for obtaining an identifier of the S-CSCF assigned to the terminal of the destination user and, then, it would forward the received INVITE to it. These flows are not shown in FIG. 4 which, for the sake of simplicity, illustrates a direct signaling between S-CSCF 120 and S-CSCF 121; wherein the latest is assumed to be the S-CSCF assigned to serve the signaling of the terminal of the destination user.

The S-CSCF 121 would forward the INVITE message towards the destination terminal (flow not shown in FIG. 4). After that, if the communication request is primarily accepted by the destination terminal and before the call is answered, various progress messages can be received in S-CSCF 120 from S-CSCF 121 which are forwarded towards the origination terminal 101, as schematically illustrated in FIG. 4 by flows 511 and 512. These flows, as well as other progress flows (not illustrated in FIG. 4) going in the opposite direction take place with, among others, the purpose of negotiating the media channels which shall finally convey the media exchanged between the originating and destination terminals when the call is answered. The processing of these signaling flows in the S-CSCF 120 can drive a state-machine and can be used in the monitoring process 460 to check the corresponding messages, and also their content, against the data in the activity template, so as to update (if necessary) the activity information stored in S-CSCF 120 for that user. For example, the activity template can comprise data stating that a user is to be marked as active for the service "multimedia communication" when media channels for exchanging video are agreed to be established between the user terminals.

The final response to the INVITE message is received in S-CSCF 120 from S-CSCF 121 in flow 513. This can be due to the reception in S-CSCF 121 of a SIP message 200 OK sent from the destination terminal when the call is answered. The S-CSCF 120 updates the state of the ongoing communication session accordingly and forwards in flow 514 the SIP message 200 OK towards the originating terminal 101. If the applicable activity template states, for example, that the user of terminal 101 has to be considered as active for the service "multimedia communication" when the final response to a SIP INVITE message is a SIP 200 OK message, then the monitoring process 460 in S-CSCF 120 shall update the activity information related to this user accordingly. As cited earlier, this can be done by establishing in the activity template the necessary data so as to check a sequence of messages, a message vs. a session status in which it is received, etc. Also, some data conveyed in the signaling of the service (509 . . . 514) can be kept by the S-CSCF 120; for example, if the activity template states that the user is to be marked only if the established communication comprises video channels.

In flow 515 the S-CSCF 120 receives a de-registration request from the user terminal 101. In IMS this is accomplished by a SIP message REGISTER containing the value zero in the parameter "Expires". In order to notify the registration event to the HSS 130, the S-CSCF sends in flow 516 a DIAMETER message SAR comprising information (REG) indicating "user deregistration". According to the invention, the message further comprises activity information (ACT) of the user in the concerned registration period. In the illustrated case, the registration period comprises a time between the initial registration 501/502 of the user of terminal 101, and the subsequent de-registration 515/516. As cited earlier, the activity information sent in flow 516 can vary according to some embodiments. For example, it can comprise a simple (e.g. unstructured) information element stating whether the user has been active or not for a service in that period. Alternatively, it can convey more complex information and comprise, for example, one or more information elements comprising identifiers of the services in which the user was involved, as well as additional information stating e.g.: if he was involved as originating or terminating party, the time in which a service took place, duration, etc.

At reception of the message 516, then the HSS 130 runs step 430, so as to update the corresponding registration information 303-2R, and step 440, so as to update the activity information of the concerned user 303-2A. In step 440 the HSS can store locally the received activity information; for example, adding the received information to the activity information stored previously, or overwriting it.

Alternatively, or additionally, the HSS 130 can forward (e.g.: periodically, upon request, when a change takes place in the activity information of a user, etc) the received (or previously stored) activity information to another node (not shown in FIG. 4). This other node can be, for example, an application server AS which can be assigned to receive this kind of information from one or more HSSs and which, e.g., can execute a post-processing of the received data for the purposes of determining usage rate of a certain services, user behaviour of certain user or group of users, etc. In IMS this can be accomplished through the so called "Sh" interface standardized by 3GPP between a HSS and an application server AS. For example, the DIAMETER message "User Data Request" UDR and User Data Answer UDA can be modified so as to include a new data reference indicating "user activity information"; thereby, allowing the AS to obtain from a HSS user activity information of users when desired. Also, the AS can subscribe to be notified from the HSS when the activity data of a user has changed. To accomplish with this feature, DIAMETER message "Subscribe Notifications Request" SNR can be modified so as to include a new data reference indicating "user activity information". Then, when the content of user activity information of a user changes in the HSS, the HSS shall then notify the change to the AS(s) which subscribed to it by means of a modified DIAMETER message "Push Notification Request" PNR indicating "user activity information" as the contained data.

The service logic in the AS aforementioned can be arranged to perform some specific functions with regard to a user, for example depending on the degree of activity of a certain user (e.g. when was the last time the user was involved in a service, what services, etc), and also with regard to a service or group of users (such as to generate service usage statistics).

The HSS 130 answer in flow 517 to the S-CSCF 120 with a DIAMETER message "Server-Assignment-Answer" SAA acknowledging the de-registration notified in flow 516. Subsequently, the S-CSCF 120 in flow 518 sends an acknowledgement of the de-registration requested in flow 515 towards the user terminal 101. The monitoring process 460 can be stopped in the S-CSCF 120 at any time of the processing of a registration event of a user subsequent to a previous registration event of the same user. For example, it can be stopped at reception of the de-registration request of flow 515 (as shown in FIG. 4), at the sending of the confirmation sent towards the user terminal in flow 518, or at any other moment during the processing of the de-registration.

The embodiment described with reference to FIG. 4 has considered nodes and signaling procedures in a IMS system. A specific characteristic in that particular telecommunications system is that a user can be assigned to a plurality of different identities with which he can be identified and reached from other users. One or more of these identities (known in IMS as "public user identities") can be referred in registration and de-registration messages REGISTER, so that a user can (explicitly or implicitly) register and/or deregister through a S-CSCF one or more of his identities from a user terminal. In IMS, the HSS assigned to store the subscription data and registration information for a given user uses to keep track on the registration status of all the eventual identities of said user, as all these identities belong to the same IMS subscription and are stored in relationship with the corresponding user subscription record USRC-X. Thus, this HSS can collect activity information of the same user according to the registration events reported from any of the S-CSCFs where said user can register through a terminal one or more of his identities. Therefore, the HSS can store and update user activity information for a user independently of the identities of said user which were registered and used in the services he was involved. Alternatively, the HSS can store activity information per user identity; for example, by checking first which identity(ies) of a user are registered through the S-CSCF which report a user activity of said user. This can also be accomplished by including in the activity information sent from a S-CSCF to a HSS the user identity used by the user when he was involved in a service.

Currently, telecommunications nodes are mostly implemented in computer-based machines. Accordingly, computer programs comprising computer-readable program codes are loaded in computer-based machines of telecommunications systems, causing them to behave according to a predefined manner, as determined by the respective program codes, which are in accordance to the specific functionality specified for the telecommunications nodes these machine implements. Thus, those skilled in creating and/or modifying computer programs, would, without departing of the teachings of the present invention, readily apply them to create and/or modify computer programs suitable to be loaded in a computer-based routing nodes or location registration nodes, so as to make them to behave according to any of the described embodiments.

The invention has been described with respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method for collecting user activity information in a telecommunications system comprising a routing node handling signaling messages of the terminal of a user and a location registration node handling registration information of said user, comprising the steps of:
   a) sending from the routing node to the location registration node a message notifying a registration event of the user, where the message registers, re-registers, or de-registers a presence of the user via the terminal in the telecommunications system, and
   b) updating, by the location registration node, registration information of said user according to the content of said message; wherein step a) further comprises:
      a1) sending in said message an information element indicating whether said user has been involved in a service provided during a registration period comprised between a previous registration event of said user and the registration event notified in the step a), and step b) further comprises the step of:
      b1) updating, by the location registration node, activity information of said user according to said information element.

2. The method of claim 1 wherein said information element comprises an identifier of a service provided to said user in said registration period.

3. The method of claim 1 wherein the step b1) comprises the step of:
   b11) storing in relationship) with the updated activity information a time stamp indicative of said registration period.

4. The method of claim 1 wherein the registration event starting said registration period is selected from:
   a. an initial registration message,
   b. a re-registration message,
   and the registration event ending said registration period is selected from:
   c. a re-registration message,
   d. a de-registration message.

5. The method of claim 1 further comprising the steps of:
   c) storing in routing node an activity template comprising data usable for identifying a signaling message related to a service, and
   d) checking in the routing node a signaling message related to said terminal against said activity template for determining whether said user is involved in a service, wherein the step a1) comprises the step of:
      a11) sending the information element indicating that said user has been involved in a service if said check has been passed.

6. The method of claim 5 wherein the activity template comprises at least one information element selected from:
   a. an identifier identifying a signaling message,
   b. an identifier identifying a sequence of signaling messages, and
   c. an identifier identifying a service.

7. The method of claim 5 further comprising the step of: e) receiving said activity template in the routing node from the location registration node.

8. The method of claim 7 wherein said activity template is received as a part of the profile data of a user.

9. The method of claim 5 wherein the step c) comprises the step of:
   c1) storing in the routing node said activity template in relationship with an identifier of a user,
   wherein the step d) further comprises the step of:
      d1) checking against the activity template that relates to said user.

10. The method of claim 1, wherein the service is provided by a presence server.

11. The method of claim 1, wherein the service is a multimedia call between the terminal of the user and another terminal.

12. The method of claim 1, wherein the service is provided by an application server.

13. A location registration node for handling registration information of a user in a telecommunications system, the location registration node comprising
   a processor and
   a storage device, in communication with said processor, and storing instructions adapted to be executed by said processor for:
      receiving a message notifying a registration event of a user from a routing node handling signaling messages of a terminal of said user in the telecommunications system, where the message registers, re-registers, or de-registers a presence of the user via the terminal in the telecommunications system,
      updating registration information of said user according to the content of said message;
      receiving said message comprising an information element indicating whether said user has been involved in a service provided during a registration period comprised between a previous registration event of said user and said notified registration event, and
      updating activity information of said user according to said information element.

14. The location registration node of claim 13, wherein said information element comprises an identifier of a service provided to said user in said registration period.

15. The location registration node of claim 13 wherein the storage device further stores instructions adapted to be executed by said processor to store in relationship with the updated activity information a time stamp indicative of said registration period.

16. The location registration node of claim 13 wherein the registration event starting said registration period is selected from:
 a. an initial registration message,
 b. a re-registration message,
 wherein the registration event ending said registration period is selected from:
 c. a re-registration message,
 d. a de-registration message.

17. The location registration node of claim 13 wherein the storage device further stores instructions adapted to be executed by said processor to send to said routing node an activity template comprising data usable for identifying a signaling message related to a service.

18. The location registration node of claim 17 wherein the activity template comprises at least one information element selected from:
 a. an identifier identifying a signaling message,
 b. an identifier identifying a sequence of signaling messages,
 c. an identifier identifying a service.

19. The location registration node of claim 17 wherein the activity template is sent in relationship with an identifier of a user.

20. A routing node for handling signaling messages of a terminal of a user in a telecommunications system, the routing node comprising:
 a processor and
 a storage device in communication with said processor and storing instructions adapted to be executed by said processor for:
  sending a message notifying a registration event of said user to a location registration node handling registration information of said user in the telecommunications system, where the message registers, re-registers, or de-registers a presence of the user via the terminal in the telecommunications system; wherein the storage device further stores instructions adapted to be executed by said processor for:
  sending said message comprising an information element indicating whether said user has been involved in a service provided during a registration period comprised between a previous registration event of said user and said notified registration event.

21. The routing node of claim 20, wherein said information element comprises an identifier of a service provided to said user in said registration period.

22. The routing node of claim 20 wherein the registration event starting said registration period is selected from:
 a. an initial registration message,
 b. a re-registration message,
 wherein the registration event ending said registration period is selected from:
 c. a re-registration message,
 d. a de-registration message.

23. The routing node of claim 20 wherein the storage device further stores instructions adapted to be executed by said processor for:
 checking a signaling message related to said terminal against an activity template comprising data usable for identifying a signaling message related to a service, and
 sending the information element indicating that said user has been involved in a service if said check has been passed.

24. The routing node of claim 23 wherein the activity template comprises at least one information element selected from:
 a. an identifier identifying a signaling message,
 b. an identifier identifying a sequence of signaling messages, and
 c. an identifier identifying a service.

25. The routing node of calm 23 wherein the storage device further stores instructions adapted to be executed by said processor to receive said activity template from said location registration node.

26. The routing node of claim 25 wherein said activity template is received as a part of the profile data of a user.

27. The routing node of claim 23 wherein the storage device further stores instructions adapted to be executed by said processor for:
 storing said activity template in relationship with an identifier of a user, and
 checking against the activity template that relates to said user.

28. A method for handling registration information of a user in a telecommunications system, the method implemented by a location registration node comprising steps of:
 receiving a message notifying a registration event of a user from a routing node handling signaling messages of a terminal of said user in the telecommunications system, where the message registers, re-registers, or de-registers a presence of the user via the terminal in the telecommunications system,
 updating registration information of said user according to the content of said message;
 receiving said message comprising an information element indicating whether said user has been involved in a service provided during a registration period comprised between a previous registration event of said user and said notified registration event, and
 updating activity information of said user according to said information element.

29. The method of claim 28, further comprising a step of sending to said routing node an activity template comprising data usable for identifying a signaling message related to a service, wherein the activity template comprises at least one information element selected from:
 a. an identifier identifying a signaling message,
 b. an identifier identifying a sequence of signaling messages,
 c. an identifier identifying a service.

30. A method for handling signaling messages of a terminal of a user in a telecommunications system, the method implemented by a routing node comprising steps of:
 sending a message notifying a registration event of said user to a location registration node handling registration information of said user in the telecommunications system, where the message registers, re-registers, or de-registers a presence of the user via the terminal in the telecommunications system;
 sending said message comprising an information element indicating whether said user has been involved in a service provided during a registration period comprised between a previous registration event of said user and said notified registration event.

31. The method of claim 30, further comprising steps of:
 checking a signaling message related to said terminal against an activity template comprising data usable for identifying a signaling message related to a service, sending the information element indicating that said user has been involved in a service if said check has been passed, and
wherein the activity template comprises at least one information element selected from:
a. an identifier identifying a signaling message,
b. an identifier identifying a sequence of signaling messages, and
c. an identifier identifying a service.

* * * * *

UNITED STATES PATENT AND TRADEMARK OFFICE
CERTIFICATE OF CORRECTION

PATENT NO. : 8,768,259 B2
APPLICATION NO. : 12/375770
DATED : July 1, 2014
INVENTOR(S) : Terrero Diaz-Chiron et al.

It is certified that error appears in the above-identified patent and that said Letters Patent is hereby corrected as shown below:

In the Drawings

In Fig. 2, Sheet 2 of 4, delete "fig. 2" and insert -- Fig. 2 --, therefor.

In the Specification

In Column 13, Line 12, delete "an specific" and insert -- a specific --, therefor.

In Column 15, Line 39, delete "a expiration value of zero seconds)." and insert -- an expiration value of zero seconds. --, therefor.

In Column 16, Line 48, delete "would no" and insert -- would not --, therefor.

In the Claims

In Column 21, Line 57, in Claim 3, delete "relationship)" and insert -- relationship --, therefor.

In Column 22, Line 2, in Claim 5, delete "in routing" and insert -- in the routing --, therefor.

In Column 22, Line 40, in Claim 13, delete "comprising" and insert -- comprising: --, therefor.

Signed and Sealed this
Eleventh Day of November, 2014

Michelle K. Lee
*Deputy Director of the United States Patent and Trademark Office*